United States Patent
Hawes, Jr. et al.

[11] 3,822,056
[45] July 2, 1974

[54] METHOD AND MEANS FOR ADDING SMALL MEASURED QUANTITIES OF SELECTED MATERIALS TO A LARGE CAPACITY MATERIAL-MIXING PLANT

[75] Inventors: Roland J. Hawes, Jr., 10 Mesa Dr., Boise, Idaho 83705; Sherman H. Brewster, Twin Falls, both of Idaho

[73] Assignee: said Howes, by said Brewster

[22] Filed: Mar. 31, 1972

[21] Appl. No.: 239,909

[52] U.S. Cl............ 259/25, 99/494, 119/51 R, 141/104, 222/1, 222/144.5, 259/DIG. 41, 259/149, 259/154, 259/165
[51] Int. Cl............................................. B01f 15/02
[58] Field of Search ........... 222/1, 132, 135, 144.5, 222/145; 119/51 R; 259/149, 154, 165, DIG. 41, 18–26; 141/9, 100, 102–105; 99/494; 100/147

[56] References Cited
UNITED STATES PATENTS

| | | | |
|---|---|---|---|
| 2,787,402 | 4/1957 | Stiner et al. | 222/144.5 X |
| 2,980,291 | 4/1961 | Schuerger | 222/135 X |
| 3,020,208 | 2/1962 | Dale et al. | 259/154 X |
| 3,175,139 | 3/1965 | Rose | 119/51 R X |
| 3,380,717 | 4/1968 | Adams et al. | 259/154 |
| 3,467,281 | 9/1969 | Archer | 222/145 X |
| 3,661,365 | 5/1972 | Cloud | 259/26 X |

FOREIGN PATENTS OR APPLICATIONS

| | | | |
|---|---|---|---|
| 995,966 | 8/1951 | France | 100/147 |

*Primary Examiner*—Harvey C. Hornsby
*Assistant Examiner*—Philip R. Coe
*Attorney, Agent, or Firm*—Klarquist, Sparkman, Campbell, Leigh, Hall & Whinston

[57] ABSTRACT

Small, measured amounts of concentrated liquid and dry flowable microingredients, such as vitamins, minerals, antibiotics and hormones, are stored and metered separately but delivered simultaneously to the large-capacity batch mixer of a commercial feed mill. Here the microingredients are added to large quantities of previously delivered macroingredients, such as various animal feed grains and molasses, during the batch-mixing cycle. The amounts of microingredients and optionally some macroingredients dispensed are accurately determined through the use of calibrated cyclically operating metering pumps in the case of liquids and augers in the case of dry materials. The number of metering pulses or revolutions required to dispense a desired quantity of each ingredient is predetermined, and each pulse or revolution is counted during operation of each metering device. When the preset number of counts for each metering device is reached, that device is automatically shut off. Delivery and mixing continues until all metering devices have reached their preset counts and shut off and all dispensed microingredients have been delivered to the batch mixer and blended into the feed.

32 Claims, 9 Drawing Figures

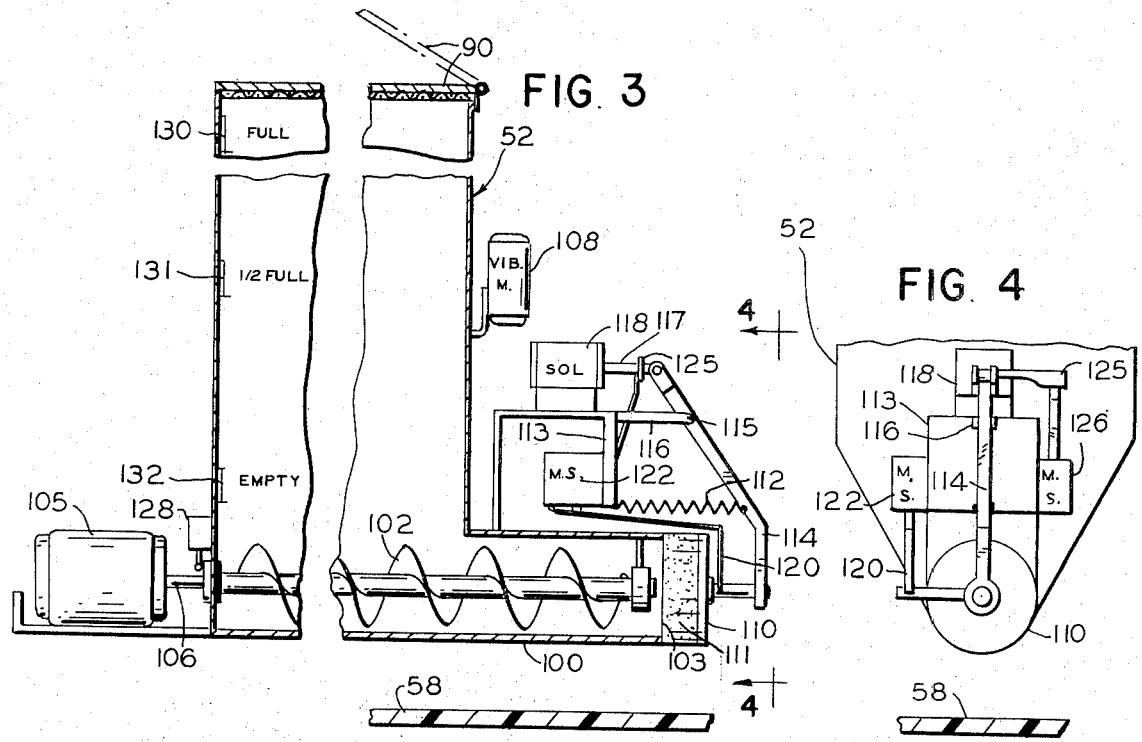
FIG. 3
FIG. 4
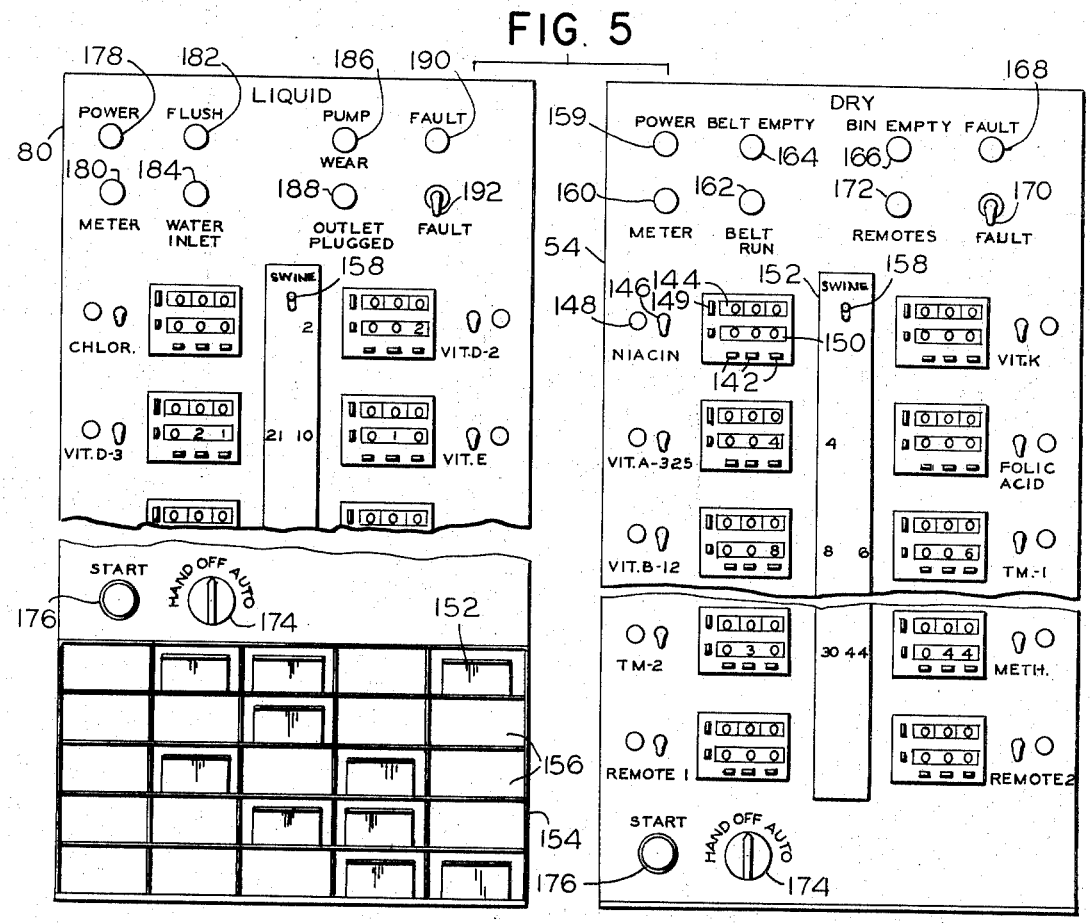
FIG. 5

METHOD AND MEANS FOR ADDING SMALL MEASURED QUANTITIES OF SELECTED MATERIALS TO A LARGE CAPACITY MATERIAL-MIXING PLANT

BACKGROUND OF THE INVENTION

1. Field of the Invention

The present invention relates to a method and means for adding small measured quantities of selected materials to and intermixing such materials with larger quantities of other materials to form a uniform mixture, and more particularly to a method and means for adding minute, accurately measured quantities of microingredient, such as vitamins, minerals, hormones and medicines, to much larger quantities of feed constituents in a feed mill during the mixing of a finished feed for animals.

2. Description of the Prior Art

Typically the manufacture of finished feeds for livestock and poultry takes place in a commercial feed mill having one or more large-capacity batch mixers. In mixing up a batch of finished feed, the feed grains and other major dry constituents of the finished feed are conveyed from separate large-capacity storage hoppers onto a scale above the batch mixer. These materials are added one by one to the scale typically in hundred-pound or ton amounts under the control of an operator in a remote control room of the mill. When the desired weights of all such materials are in the scale, the scale doors open to dump the materials into the batch mixer where the materials are thoroughly mixed and where molasses is often added to the mixture.

Often additional macroingredients are added directly into the batch mixer or into the scale, but in smaller amounts than the major feed ingredients. Such smaller-portion macroingredients, such as salt, urea, calcium, phosphorus, methionine, iron oxide, oyster shell, brewer's yeast, bone meal, and other materials, are known in the field as "cut-ins," and are added in pound or ounce amounts which cannot be accurately weighed on the scale. Heretofore these cut-ins have often been shoveled onto the scale or into the mixer by hand, or augered from bins, but in either case with the operator only roughly estimating the quantity of each cut-in added to the batch mix.

Heretofore vitamins, trace minerals, antibiotics, hormones, and other microingredients have first been premixed together, usually in the presence of an inert filler material representing up to 99 per cent of the premix, in a separate manufacturing operation and often by a separate manufacturer. Such premixes are either bagged and stored at the commercial feed mill for use in making up the batches of finished feed or stored in overhead bins above the mixer. When bagged, an operator might be required to add manually so many bags of the microingredient premix to the batch mixer or scale after the feed grains and other macroingredients have been added. Alternatively the premix might be fed directly into the batch mixer or scale from an overhead bin. In either case only a rough approximation of the desired amounts of various microingredients enters the batch.

The amount of microingredient added to the feed through the premix depends also on the quality control of the premix manufacturer. The kinds and quantities of various microingredients added to the finished feed is also limited by the premix formulations available from the premix manufacturers. Furthermore, the effectiveness of the various microingredients added to the feed mixture may vary considerably from batch to batch depending on the age of the premix since many microingredients will lose potency with age when they are intermixed with other microingredients.

Further disadvantages of existing conventional methods of adding microingredients and small quantities of macroingredients to animal feed mixes include (1) the high cost of manufacturing or purchasing premises, (2) the additional time and labor required to add cut-ins and microingredient premixes to a batch mixture thereby increasing the overall time of a batch-mixing cycle, (3) the large amounts of storage space required to store premixes in the feed mill, (4) the lack of flexibility as to the kinds and quantities of various microingredients that can be added to the finished feed through a premix, (5) the inability to determine or control the amounts of individual microingredients that are actually added to the finished feed, and (6) the large dollar investment required in premix inventory.

Although others have developed metering devices for metering multiple ingredients into a mixture, such prior devices have operated on a time principle, starting and stopping all metering devices at the same time. Therefore, to vary the quantity of one material dispensed without varying the quantities of all materials, so as to change proportions, it would be necessary either to have variable speed-metering devices or interchangeable metering devices of different capacities. Either means makes changing proportions of a mixture a time-consuming and difficult procedure.

SUMMARY OF THE INVENTION

According to the present invention, the foregoing disadvantages inherent in the present methods of adding microingredients and smaller quantities of macroingredients in feed or other material-mixing operation is eliminated. Microingredients in highly concentrated liquid or flowable dry particle form are stored in separate containers in the feed mill. During a batch-making cycle, usually while the various major constituents of the final mixture are being mixed in a batch mixer, predetermined variable but accurate amounts of selected but variable microingredients are separately metered from ther individual containers but simultaneously delivered as soon as they are dispensed directly into the feed mill and usually directed into the batch mixer as mixing proceeds.

The dry microingredients are metered onto a delivery belt system or other dry conveyor system leading to the mill and added in their concentrated dry form directly but gradually to the mixture. The liquid microingredients are metered into a small amount of a flowing inert liquid carrier, usually water, which is then pumped to the mixer and there sprayed in a fine mist directly into the mixer as mixing proceeds. The liquid and dry microingredients may be added to the mixture either simultaneously or at separate times during the mixing cycle.

Accurate control of the quantity of the various selected microingredients added to the mixture is maintained by counting the metering cycles of carefully calibrated, cyclically operating metering devices, such as positive-stroking pumps in the case of liquids, or revolving metering rods or augers in the case of dry materials, used to meter the various microingredients. When each metering device has operated continuously for a predetermined number of cycles, which may be different for each different metering device and ingredient, the metering device is stopped. Although the several metering devices may commence operation simultaneously, they will shut off at different times during a mixing cycle depending on the number of operating cycles or counts required of each metering device. In this way any desired combination of microingredients and in any of varying amounts may be added to a given batch mixture of materials. Thus many different microingredient formulations can be designed to fit any finished feed composition made by the mill.

Control features of the machine permit automatic starting of a microingredient delivery cycle during a preselected phase of the overall feed mixing cycle, prevent completion of a feed-mixing cycle in the event of a fault in the microingredient delivery system, enable quick location and correction of faults in the microingredient delivery system, ensure the delivery of uniform amounts of material during each metering cycle within close tolerances, prevent inadvertent dispensing of non-selected microingredient materials, and enable the accurate control of amounts of small quantity macroingredients, that is, cut-ins added during a mixing cycle.

Objects, features and advantages of the present invention include:

1. elimination of the use of microingredient premixes in the manufacture of finished feed;
2. the use of microingredients in a highly concentrated form in the mixing process, thereby eliminating the need for large quantities of storage space for storing premixes and saving costs on microingredient purchases by buying such microingredients separately in their concentrated forms, often directly from the manufacturer;
3. improving the stability of the microingredients by eliminating the premix step and by storing the microingredients separately until added to the finished feed;
4. providing flexibility in the kinds and quantities of individual microingredients that can be added to a given feed mixture through the separate storage and metering of the concentrated microingredients;
5. the ability to add concentrated microingredients in either liquid or dry form;
6. the ability to add dry concentrated microingredients in their concentrated form directly and progressively to the major ingredients in the mixer during the mixing cycle to gradually fold or blend in the highly potent microingredients with the major constituents, thereby ensuring a more uniform distribution of more potent microingredients throughout the final mix;
7. providing an increase in production of finished feed in many cases due to the shortening of a batch-mixing cycle because of the elimination of premix handling operations and reduction of time required to add cut-ins to a batch;
8. reduction in the total dollar investment in microingredient inventory required;
9. reduction in the manual labor required of employees during the mixing operation;
10 more accurate inventory control;
11. improved quality of the finished feed mixture through more accurate quality and quantity control of the microingredients added to the final mix and because of the improved stability of the more potent form of microingredients added to the final mixture; and
12. the ability to change microingredient combinations and quantities of selected microingredients dispensed quickly and easily without the need for variable speed metering devices or the need to change metering devices, simply by controlling the number of metering cycles for which each different metering device will operate during a mixing cycle.

The foregoing and other objects, features and advantages of the present invention will become more apparent from the following detailed description, which proceeds with reference to the accompanying drawings.

BRIEF DESCRIPTION OF THE DRAWINGS

In the drawings:

FIG. 3 is a vertical sectional view showing a dry ingredient storage bin and its metering device taken along the line 3—3 of FIG. 2;

FIG. 4 is a view looking toward the front of a dry microingredient bin taken along the line 4—4 of FIG. 3;

FIG. 5 is a foreshortened front elevation of portions of liquid and dry microingredient system remote control panels used in controlling the operation of the dry and liquid delivery systems of the invention;

FIG. 9 is a circuit diagram of a typical counter circuit for one of the counters shown in FIG. 6.

DETAILED DESCRIPTION

General Arrangement

Figure 1:
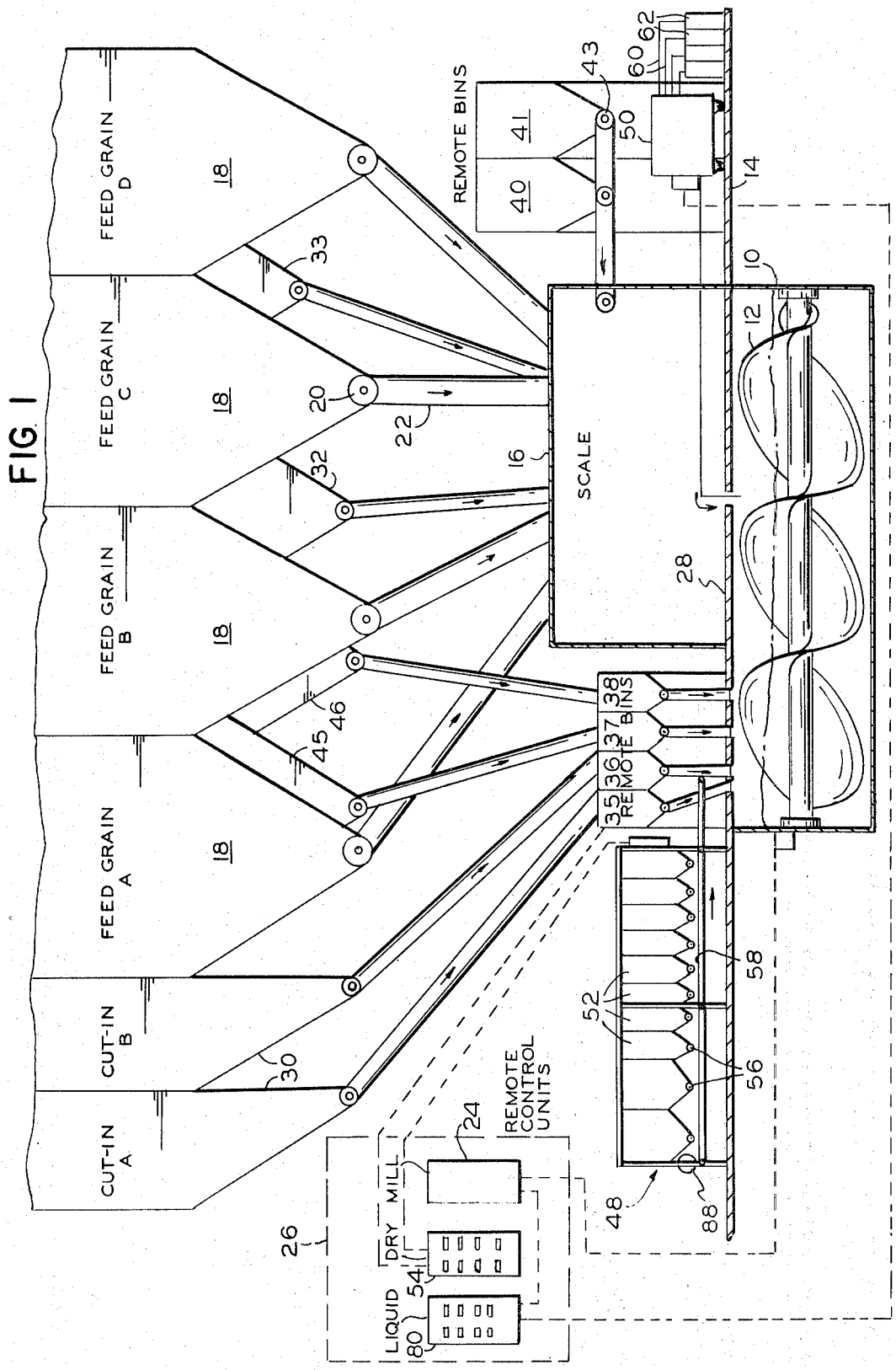
FIG. 1 is a schematic elevational view of a feed mill incorporating a microingredient delivery and control system in accordance with the invention.

With reference to the drawings, FIG. 1 discloses a lay-out of a typical commercial feed mill utilizing a microingredient delivery system of the invention. The mill includes a conventional large-capacity batch feed mixer 10 typically capable of mixing finished livestock and poultry feeds in batches of 6,000 pounds or more. The batch mixer shown is known as a "ribbon mixer" and incorporates a large rotating mixing auger 12. The batch mixer 10 is mounted below the floor level 14 of the mill. Above the match mixer a large capacity hopper-type weighing scale 16 is provided for holding and weighing various feed grains and other major materials which go into making up a batch of finished feed. These major constituents of the final mixture are typically stored in large overhead hoppers 18 at a level above the scale. The storage hoppers 18 usually have augers 20 at their lower ends which auger material into chutes 22 which deliver the material to the scale.

In making up a batch of feed, each major constituent is delivered to the scale 16 one by one in succession until the desired quantity of each constituent is in the scale. Control of the batch make-up occurs and is monitored from a remote control mill panel 24 in a control room 26 remote from the mixer, hoppers and other working components of the mill. When the desired quantity of each major component is in the scale, the scale door 28 opens to dump these macroingredients into the batch mixer where they are mixed by the mixing element 12.

Formerly other overhead bins 30 have sometimes been used to store microingredient premixes which are added directly to the batch feed mixer or scale after the major ingredients had been weighed out. However, such premixes are added in too small quantities to be measured accurately on the scale. Because of the elimination of premixes by this invention, bins 30 can be used to store cut-ins such as calcium and phosphorus.

Other overhead bins 32, 33 and 45, 46 can now be used to store other cut-ins such as salt, urea, bentonite and potassium chloride, some of which were formerly added by hand to the scale or mixer. In the illustrated system some of these large bins of cut-ins are now used to fill remote secondary storage bins 35, 36, 37, 38, 40 and 41. Each remote bin is equipped with a calibrated metering auger 43 which is tied in with the metering control system of the invention to control accurately quantities of these cut-ins added to the batch mixer or scale.

As thus far described, the mill is conventional except for the addition of the remote bins 35 through 41 and the metering devices 43 for delivering cut-in macroingredients to the batch mixer or scale. Other unconventional portions of the mill include the use of former premix bins 30 for macroingredient cut-ins and delivering ingredients from these bins to the remote bins.

The microingredient delivery system of the invention is adjacent the feed mill and includes a dry microingredient machine 48 and a liquid microingredient machine 50. The dry machine stores various microingredients in a dry concentrated flowable form in separate storage bins 52 which may vary in size and quantity, but which typically may be of one to two cubic foot capacity. Selected dry microingredients as determined and controlled at a remote control panel 54 within control room 26 are delivered in predetermined quantities through separate cyclically operating metering devices indicated generally at 56 onto a conveyor means comprising a delivery belt 58. This belt or a system of such belts carries the dispensed dry microingredients directly to the batch mixer 10 where they are usually added directly to the batch feed. However, this can vary, and in some mills it may be more advantageous to deliver them to the scale 16.

The liquid machine 50 is connected by tubing 60 to barrels 62 containing supplies of different microingredients in concentrated liquid form. Positive-displacement liquid pumps 64 within the liquid machine, as shown most clearly in FIG. 2, pump liquid from the containers 62 through suction lines 60 and then through pressure lines 66 into a trough 68 which carries a flow of water from a water supply pipe 70. The water acts as an inert carrier for the liquid microingredients. After the microingredients enter the carrier, it drops into a suction pipe 71 leading to a delivery pump 72 driven by motor 74 which pumps the liquid through a delivery pipe 76 to a nozzle 78 within the batch mixer. The nozzle sprays the mixture of liquid microingredients into the batch mixer in a fine mist as mixing occurs to enhance the uniform mixing of the liquid additives throughout the mixture.

Figure 2:
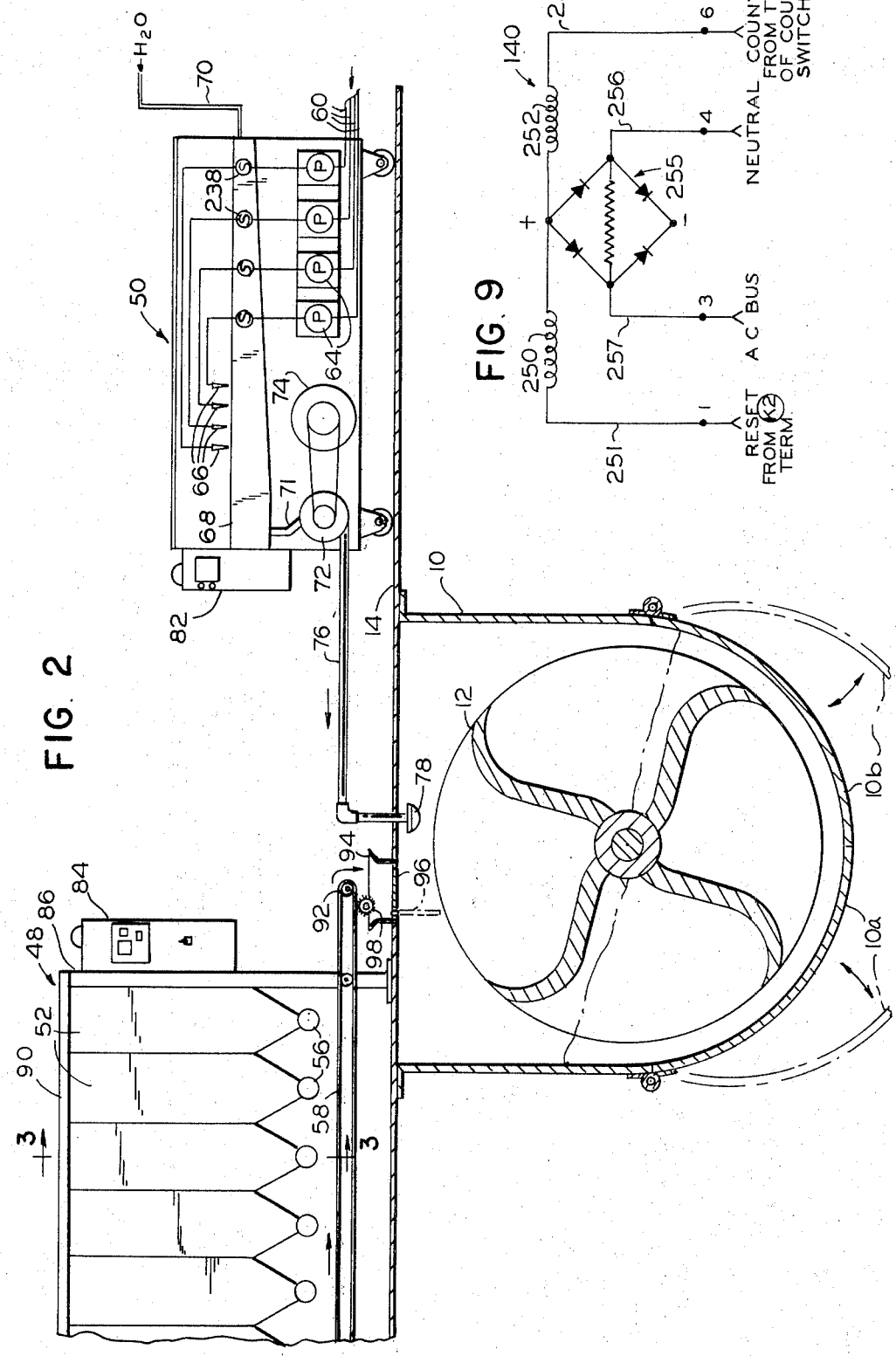
FIG. 2 is a schematic elevational view of liquid and dry microingredient delivery portions of a system in accordance with the invention and their relationship to a batch mixer of the feed mill, on a larger scale than FIG. 1.

As shown in FIG. 2, the batch mixer has bottom doors 10a, 10b which open after the mixture of major ingredients and microingredients have been thoroughly intermixed to dump the finished feed into a hopper from which the feed can be bagged and then stored and eventually delivered to the customer. The liquid machine 50, like the dry machine 48, is operably and electrically connected to a remote control panel 80 in the control room 26.

Although control of the delivery of small quantities of macroingredients from remote bins 35-41 can be controlled from either the dry control panel 54 or the liquid control panel 80, in the illustrated embodiment these bins are controlled from the dry control panel.

Typically the dry microingredient machine meters microingredients in gram quantities during the make-up of a batch of feed while the liquid machine delivers liquid microingredients typically in cubic centimeter quantities. On the other hand, the remote bins deliver small quantities of macroingredients in amounts ranging from several ounces to several pounds, all of which can be controlled accurately within close tolerances through the use of the control system to be described of either the dry or the liquid machine.

The liquid machine is smaller in design, construction and operation to the liquid portion of the machine shown in FIG. 15 of U.S. Pat. No. 3,427,075, and the liquid portion of the machine shown in FIG. 1 of copending U.S. patent application Ser. No. 34,335, filed May 4, 1970, and now U.S. Pat. No. 3,670,923, except for the manner of determining the quantities of various liquid additives dispensed. The liquid machine itself mounts a control box 82, which houses some of the electrical circuitry for the liquid control system. This box is operably connected to the liquid control panel unit 80 in the remote control room 26.

DRY MACHINE

Referring to FIG. 1, the dry machine 48 also has a control box 84 mounted on the machine frame 86. This box is electrically connected to the dry control panel 54 in control room 26.

The multiple storage bins 52 of the dry machine are mounted in one or two opposed banks along one or both sides of the delivery belt 58. The machine frame mounts all of the major operating components of the machine, including a motor 88 which drives the delivery belt and the motors which drive the metering devices for each bin. The frame includes a hinged cover 90 which covers the upper bin filler openings when closed to prevent any dust problem. Each bin is preferably appropriately labeled to indicate the kind of microingredient in such bin.

The offbear end 92 of delivery belt 58 or the delivery belt system terminates at a delivery chute 94 leading directly into the batch mixer. The chute feeds material dropped from the belt by gravity into the mixer. The chute includes a flappertype door 96 which is normally closed to reduce the possibility of dust rising out of the mixer as various major materials are added, but which opens when the dry machine is operating to permit the dry microingredients to fall through the chute into the batch mixer. A motor-operated brush 98 at the under-side of the delivery belt at its offbear end cleans the belt of any residue that may tend to stick to the belt and brushes it into the delivery chute. Thus virtually all dry microingredients dispensed are delivered into the batch mixer.

FIG. 3 shows the constructional details of a typical dry microingredient storage bin 52. The bin itself is of generally rectangular uniform cross section throughout the major portion of its length but tapers near its lower end to terminate at an auger housing which includes a projecting tubular portion 100. This portion projects forwardly from the front face of the bin over the delivery belt 58.

The metering auger is driven by an electric auger motor 105 through a drive shaft 106. Each metering auger is carefully calibrated to determine how much material is dispensed by the auger during each revolution. From this the number of revolutions of the auger required to dispense a desired amount of dry microingredient can be accurately determined and this information then used to make up microingredient formulations for use with various feed formulations in the batch mixer.

To ensure that there is a ready flow of material within the bin to the auger at all times during rotation of the auger, the front face of the bin mounts a vibrator motor 108 for shaking the bin during its operation. Because all bins of the machine are not used during any one operating cycle, it is necessary to provide the auger tube outlet opening 103 with a normally closed cover 110 to prevent the inadvertent spillage of material from auger tube 100 onto the delivery belt from an inactive bin when an adjacent active bin is vibrating.

The auger tube closure 110 has a resilient seal 111 and is normally maintained closed by a coil spring 112 extending between a fixed member 113 mounted on the auger tube and a closure-actuating lever 114. Lever 114 is pivoted at 115 between its opposite ends to a pivot support 116 carried by member 113. The closure is selectively pivoted to its open position about pivot 115 by the withdrawal of the plunger 117 of a solenoid 118 carried by base member 113. The solenoid is energized to open the closure member 110 only in response to both rotation of the metering auger 102 and a positive pressure of material bearing on the closure member 110 from the inside of the auger tube urging the closure member open slightly. When this occurs, the closure 110 moves an actuator arm 120 of a microswitch 122 which in turn energizes the solenoid 118 to open the closure to its full-open position.

Figure 8:
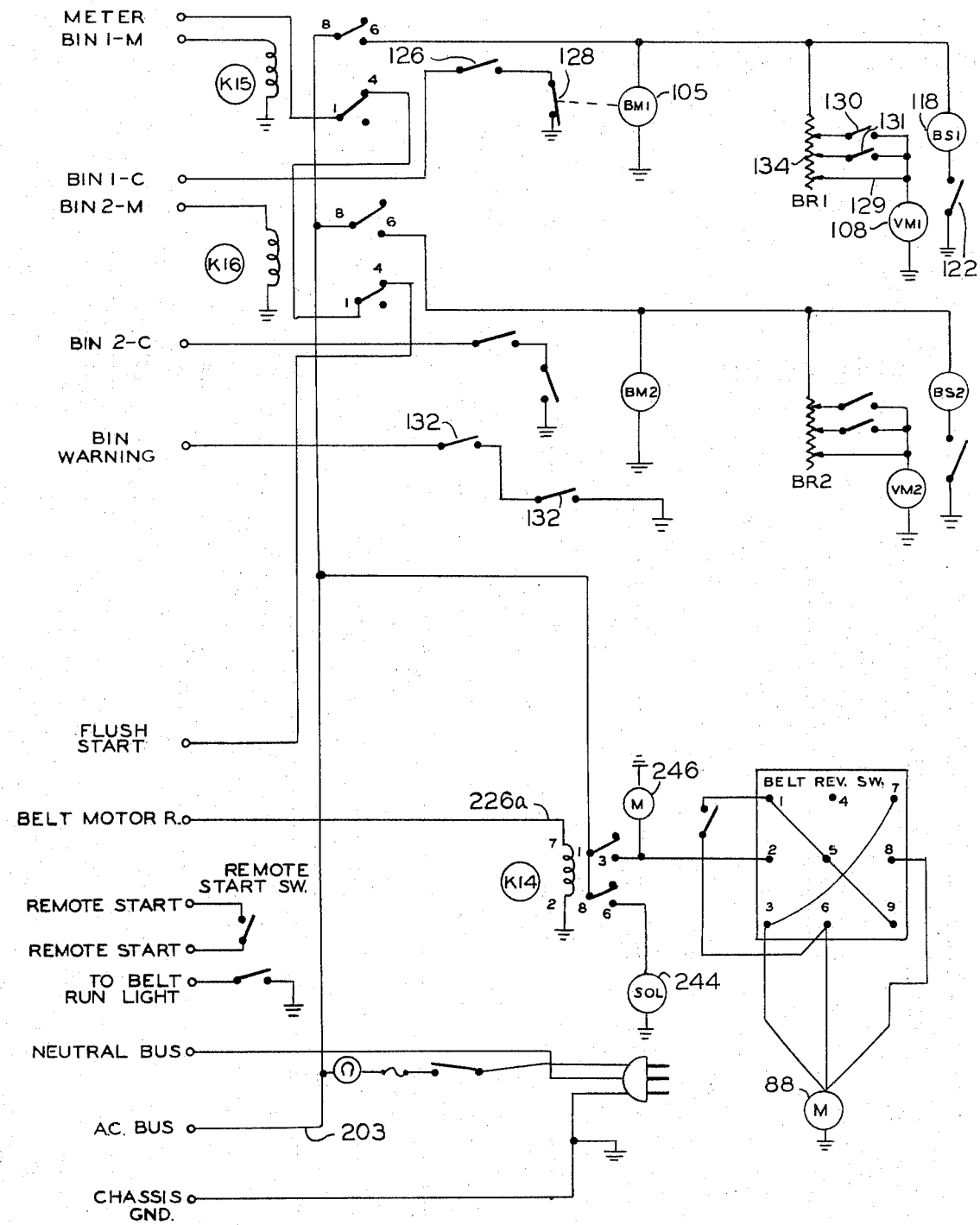
FIG. 8 is a circuit diagram of the machine side of the control system for the dry ingredient delivery system.

When solenoid 118 is energized to withdraw solenoid plunger 117, this plunger actuates a switch-actuating arm 125 of a second microswitch 126. As shown in FIG. 8, microswitch 126 is connected in series with another microswitch 128. The latter switch opens and closes once during every revolution of the metering auger 102 through cam actuation from the auger drive shaft 106. Both switch 126 and switch 128 must be closed to transmit a pulse counting signal to the associated counter on the dry machine remote control panel 54 and record a count. Thus each count represents one revolution of the auger for the purpose of monitoring actual flow of material onto the delivery belt.

It has been found in practice that if vibrator motor 108 is vibrated at a constant frequency at all levels of material within the bin 52, a considerably greater amount of material will be dispensed per auger revolution when the bin is low than when the bin is full. Thus vibrator motor 108 is designed to operate at a high frequency when the bin is full or nearly full of material, at an intermediate frequency when the bin is at a lower level, and at a low frequency when the bin level is low. For this purpose, two material-sensitive switches 130, 131 are positioned at different levels along the vertical bin wall. These switches as shown in the control circuit diagram of FIG. 8 intersect different levels of a resistor 134 in the circuit of vibrator motor 108. When the bin is full, the uppermost switch 130 is closed and power flows to the vibrator motor through only a very short section of resistor 134. However, when the material in the bin is at an intermediate level below switch 130, switch 130 opens and power flows to the vibrator motor 108 through switch 131 and a greater section of the resistor to operate the motor at a slower frequency. Finally when the level of material within the bin is very low, the two switches 130 and 131 are both open and power flow is through the full length of the resistor and across a closed contact 129 to operate the vibrator motor at a very low frequency.

GENERAL SYSTEM OF OPERATION

The general operation of the dry and liquid microingredient delivery systems can be best explained, at least in part, with reference to the dry and liquid control panels shown in FIG. 5. The dry control panel is generally larger than the liquid panel simply because there are usually more dry microingredients to be controlled than liquid microingredients. Another reason is that, in the illustrated embodiment, control of the remote macroingredient cut-ins is through the dry control panel. However, except for this difference the remote panels and electrical control circuitry for the dry and liquid controls are nearly identical.

In general the selection of the kinds of microingredients to be dispensed and the respective quantities of each dispensed are controlled through a system of counters arranged within each of the liquid and dry control panels, there being one counter unit for each different liquid and dry microingredient in the liquid and dry machines. Additionally the remote dry control unit 54 includes additional counter units for controlling the operation of the various remote bins 35–41 of the mill.

Figure 6:
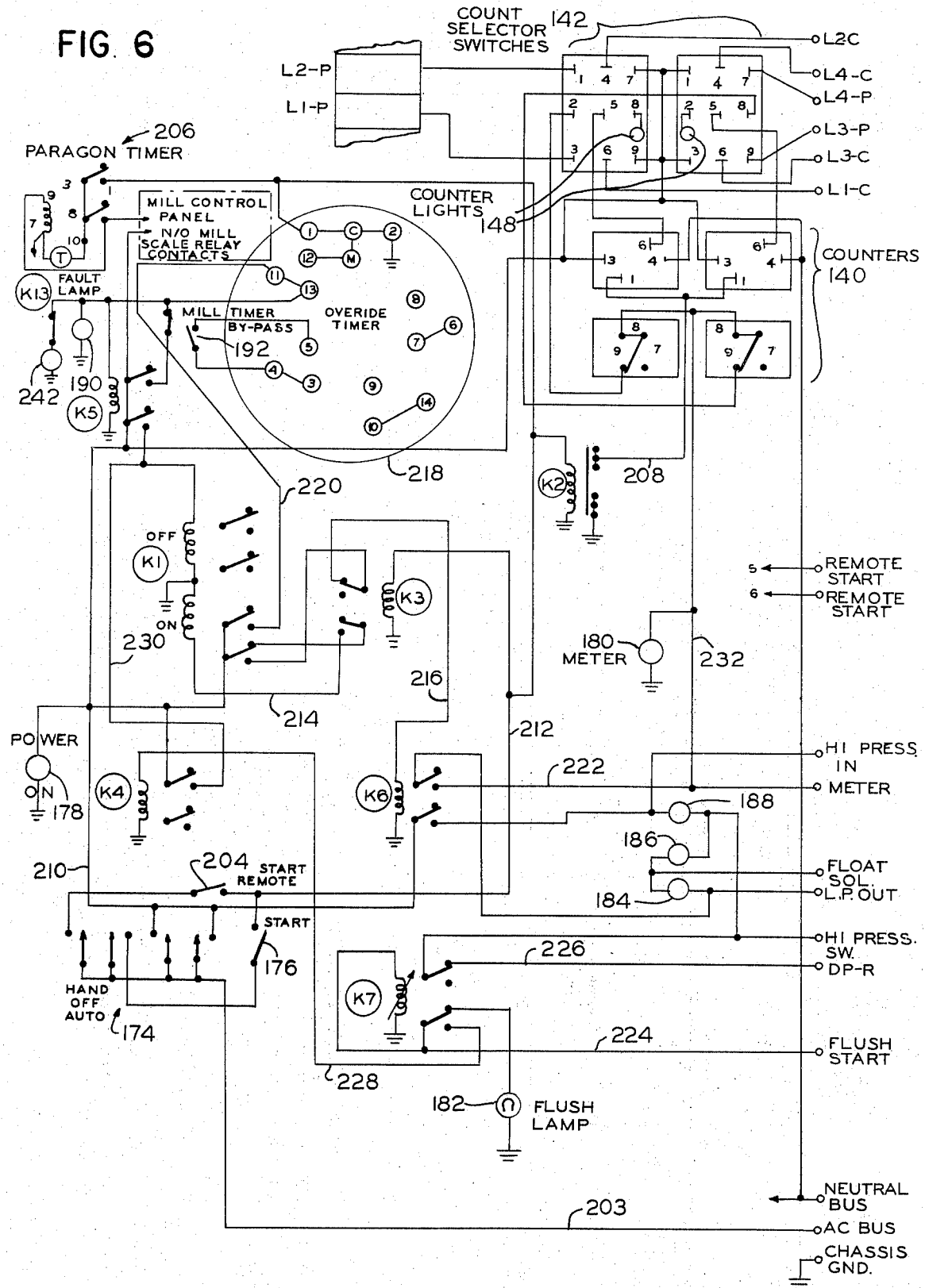
FIG. 6 is a circuit diagram of the remote control panel side of the control system for the liquid delivery system.

Each counter unit includes, in addition to the actual electrical counters themselves, indicated generally at 140 in FIG. 6, count selector switches indicated generally at 142 in FIG. 6 and visual count recorders shown generally at 144 on the dry and liquid control panels. The count selector and recorder portions of the counter units are arranged in vertical banks on the face of the dry and liquid control panels. Thus each different count selector and recorder in a bank represents a different microingredient to be dispensed.

When an operator wishes to operate a particular counter during a mixing cycle, he switches a toggle switch 146 beside each counter to one of its "on" positions which causes a lamp 148 next to the toggle switch to light. The operator also resets the count recorder 144 to zero by pressing a reset button 149. The desired count during the next operating cycle is preset on a visual preset recorder 150 by pressing one or more of the three count selector switch buttons 142 the desired number of times. Thereafter with the machine in operation, the counter automatically counts the number of metering cycles of a corresponding metering device dispensing a selected microingredient. When the preset count is reached as indicated on the count recorder 144, the control circuit automatically shuts off the metering device.

In the case of dry machines, each different counter counts the number of revolutions of a selected metering auger to control the quantity of a given dry microingredient dispensed onto the delivery belt 58. In the base of the liquid delivery system, each different counter counts the number of pump strokes or pulses of a selected liquid pump and then shuts off the pump when the preset count is reached as indicated on the count recorder.

In the case of both the liquid metering pumps and the dry metering augers, each metering cycle of each pump and auger is carefully calibrated so that the exact amount of material dispensed during a metering cycle is known. From this information microingredient formulations are designed for each different type and different batch quantity of feed made in the feed mill. These different microingredient formulations are recorded on rigid metal or plastic formula strips 152. By recording on a given strip the quantity of each different microingredient required for a given feed mix in terms of the number of counts required of the metering device for such microingredients, and by indexing that count with the corresponding count selector and recorder in the appropriate bank of such selectors and recorders, the strip indicates immediately to a relatively unskilled operator both the kinds of microingredients to be used for a given feed mix and the quantity of each kind of microingredient to be added to the batch mixer during a mixing cycle.

For example, referring to the dry control panel 54 of FIG. 5, the metering strip 152 indicates a microingredient formulation to be used in making a swine feed. The formulation will include four counts of vitamin A–325, eight counts of vitamin B–12, 30 counts of trace mineral No. 2, 44 counts of methionine, and six counts of trace mineral No. 1, all of which will be dispensed from the dry machine. Also as indicated on the liquid control panel 80, the same swine mix will have added to it several liquid microingredients including two counts of vitamin D-2, 10 counts of vitamin E, and 21 counts of vitamin D-3. The operator would then preset the indicated counts on the appropriate count selectors and switch the toggle switches for such count selectors to their "on" positions.

When this is done, both the dry and liquid machines are ready to be operated through a complete operating cycle. Although all of the dry and liquid metering devices may commence operation at the same time, obviously the various metering devices will stop operating at different times during a batch-mixing cycle, depending on the number of counts each different metering device is programmed to operate. Although the liquid and dry metering machines may operate simultaneously during the batch-mixing cycle, they can also operate at different times during the cycle. For example, the dry machine can be set to commence operation automatically when the scale door 28 of the feed mill is open to dump the major ingredients into the batch mixer. On the other hand, the liquid machine can be made to begin operation automatically at a different phase of the mixing cycle, for example when liquid molasses is added to the batch mixer, which occurs nearer the end of the batch-mixing cycle.

All of the metering devices of both the liquid and dry machines are designed to complete their operating cycles through a maximum number of counts, well within the time period within which the batch mixer operates. However, as a safety override feature, both the dry and liquid control systems are tied into the mill control system so that if the count of any metering device is not completed before the end of a batch-mixing cycle, the batch mixer cannot dump its mix, that is, cannot automatically complete its mixing cycle. However, when either the fault in the liquid or dry delivery system is corrected or when the operator manually overrides this safety feature, the mixing cycle can be completed.

There will usually be a different dry formula strip and liquid formula strip 152 for each different feed mix which the mill manufactures. Thus naturally there will be a large number of strips. To accomodate such strips, a strip storage cabinet 154 is provided with various openings 156 to accomodate different categories of strips. Each formula strip 152 is designed to hang from a pin 158 provided on each control panel so that the strip hangs down between and along two opposed banks of count selectors and recorders. In this manner the strips can be quickly and easily interchanged.

The remote counters designated "remote 1" and "remote 2" at the bottom of the dry control panel are operably connected to the mill control system and specifically the auger motors for predetermined remote bins. These counters count the metering cycles of the metering augers of such remote bins and thereby control accurately the quantities of various cut-in macroingredients added to the mixer or scale at a selected phase of the mill cycle.

Each of the remote control panels 58 and 80 also contains other switches and lights necessary to control and monitor the complete operation of the dry and liquid machines from the remote control room 26.

At the upper end of each panel is a series of indicator lights. Referring to the dry machine, a power-on lamp 178 lights when the main power to the machine is turned on by a power-on switch 159 shown, for example, in FIG. 7 of the control circuit diagram. A meter lamp 160 lights when metering commences. A belt-run lamp 162 is a wink light which operates when the delivery belt 58 is running. A belt-empty lamp 164 lights when all metering has stopped but the belt continues to run to deliver the last of the dispensed dry microingredients to the batch mixer. It goes off again when this flushing of the belt is completed.

In addition there are two alarm lamps. One is binempty lamp 166 which lights when one of the bins is nearly empty to signal that refilling is needed. The other is a fault lamp 168 which lights when there is a fault in the dry delivery system, discovered when the safety override timer of the system has timed-out. This, as previously indicated, will prevent the batch mixer from completing its mixing cycle unless the fault switch 170 is actuated to override this safety feature. A remote lamp 172 lights when the remotes are being metered through the count system of the dry metering control panel.

Both the dry and liquid control panels include threeposition hand-off-auto switches 174. By turning this switch to its "hand" position, the dry or liquid metering systems can be started by the operator in the remote control room and such systems will automatically run through their operating cycles. By switching these switches to their "auto" positions, the dry and liquid delivery cycles can be started automatically by a selected function of the batch mixer, such as the opening and closing of the scale door 28. Each of the control panels is also provided with a start switch button 176 which must be pressed to start the microingredient delivery cycle when the switch 174 is in its "hand" position.

The liquid control panel has approximately the same system of lights as the dry control panel including a power-on lamp 178 and a metering lamp 180 which have the same functions as the corresponding lamps of the dry control panel. In addition there is a flush lamp 182 which indicates when metering of liquid additives has been completed but water carrier continues to flush the delivery pipes of the dispensed microingredients. A water inlet lamp 184 lights in response to closure of a low pressure switch 185 (FIG. 7) in the water inlet pipe indicating some port of blockage in such pipe. A pump wear lamp 186 lights in response to the opening of a float switch 187 caused by a rise in liquid level in the liquid carrier trough 68, usually indicating a malfunction of the delivery pump 72 or a blockage in the trough outlet pipe 71. An outlet plugged lamp 188 lights when a high pressure switch 189 opens in response to a high pressure on the outlet side of the delivery pump 72, usually indicating some sort of blockage in the delivery pipe 76. A fault lamp 190 and fault switch 192 on the liquid control panel have the same function as the corresponding lamp and switch 168, 170 on the dry control panel.

CONTROL SYSTEM

Figure 7:
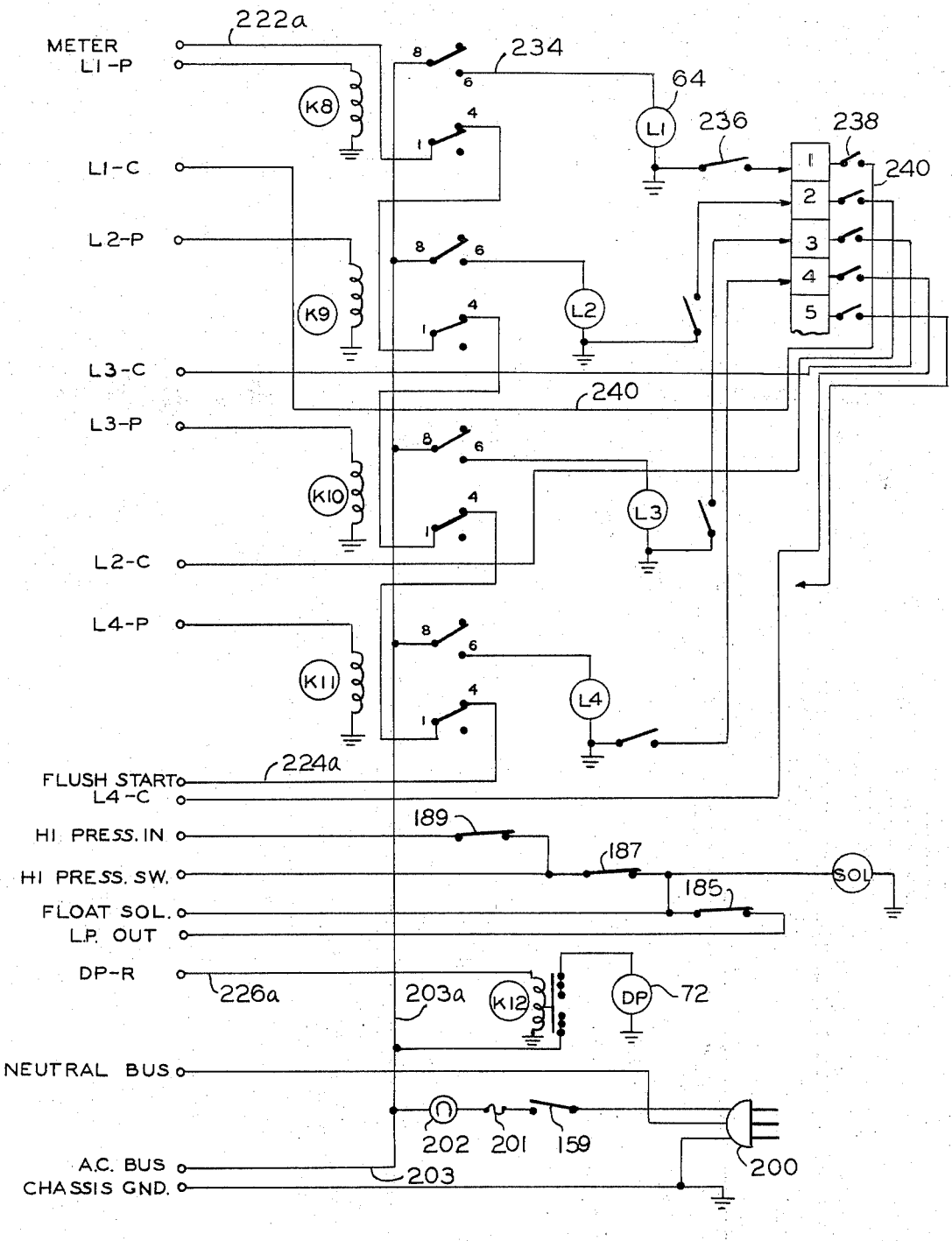
FIG. 7 is a circuit diagram of the machine side of the control system for the liquid delivery system.

The control system for the liquid and dry machines will be described with primary reference to the control circuit diagram of FIG. 6 showing the liquid control panel side of the liquid machine circuit and FIG. 7 showing the liquid machine side of the liquid control circuit, although reference will also be made to FIG. 8 showing the dry machine side of the dry system control circuit. Although FIG. 6 shows the control panel side of the liquid control circuit, such diagram also applied in large measure to the control panel side of the dry system control circuit, and any differences will be readily apparent to any skilled electrician. Much of the description which follows therefore, applies to both the liquid and dry control circuits.

In the circuit diagrams, all relay and switch contacts are shown in their open or non-operative positions. The safety override timer in FIG. 6 is shown in its timed-out position, although it will be understood that the timer normally does not time out during operation of the control system unless a fault develops in the delivery system.

Power is supplied to the control units from independent 30-amp circuit breakers. The power comes in through a plug 200 into the machine control box 82 or 84 at the dry or liquid machine and then through a power-on switch 159, fuse 201, and power-on lamp 202 at the machine control box to an A. C. bus line 203 leading to the remote control panel unit. With switch 159 closed at the machine control box and the hand-off-auto switch 174 on the remote control panel turned to either its "hand" or its "auto" position, the machine is ready for operation.

The operator in the control room 26 would select the desired formula strips 152 and place them on the liquid and dry control panels and then use them to select the desired counters and number of counts for operation during the next batch-mixing cycle.

With the counters thus set, the control circuit is activated by closing the "start" switch 176 if switch 174 is in its "hand" position. If switch 174 is in its "auto" position, the circuit may be activated by depressing a remote start switch 204 at the machine control box, which parallels the start Alternatively, with switch 174 in its "auto" position, a start may be initiated by the closing of a normally open relay contact in the mill control panel 24, usually closed by the opening and closing of the scale door 28. This relay contact activates a pargon timer indicated generally at 206, which includes a relay K-13.

Activation of the control circuit by any of the foregoing three means energizes the coil of a reset relay K-2. The application of voltage to the coil of reset relay K-2 provides a ground through its contacts 2, 3 and 4 to its contacts 5, 6 and 7 to energize the reset coils on all counters 140 through line 208. This function ceases when reset paragon timer 206 times out or when the manual start switch 176 is released.

At the same time that voltage is applied to the coil of reset relay K-2, voltage is also applied to contacts 9 and 10 of a latch relay K-1 through a line 210. This line also energizes the power-on light 178 on the remote control panel.

At the same time, voltage is also applied to the coil of a transfer relay K-3 through line 212. This closes contact 8-6 of the K-3 relay, thereby transmitting voltage through the closed K-1 relay contact 10-3 and the now-closed K-3 relay contact 8-6 and line 214 to the latch-on coil of latch relay K-1. With the latch-on coil of K-1 energized, it will remain energized until the latch-off coil of relay K-1 is subsequently energized.

The coils of relay K-2 and K-3 are released when the manual start switch 176 is released, when the remote start switch 204 is released, or in the case of mill-coordination when the paragon timer 206 times out.

With the on coil of relay K-1 energized and the coil of relay K-3 deenergized, voltage is applied to the coil of metering relay K-6 through the now-closed K-1 relay contact 10-6, the reclosed K-3 relay contact 1-4, and a line 216. At the same time the K-1 relay latch-on coil also energizes the safety override timer 218 through now-closed K-1 relay contact 9-4 and a line 220 leading to override timer contact 11.

With the control circuit in this condition and if no liquid metering pumps or dry metering augers have been selected for operation, voltage is transmitted through now-closed contacts 1-3 of metering relay K-6 and a line 222 on the panel side and line 222a on the machine side to normally closed auger motor or pump motor relay contacts 1-4. These contacts are shown in FIG. 7 with reference to liquid pump relays K-8, K-9, K-10 and K-11 and in FIG. 8 with reference to the auger motor relays K-15 and K-16. Voltage transmitted through these contacts and through a line 224 and 224a energize the coil of flush timing relay K-7 and contact 8 of this relay.

Although relay K-7 is called a flush relay in the liquid machine, it is referred to as the belt-empty relay in the dry machine. In both instances the function of this relay is to keep the water delivery pump 72 of the liquid machine and the delivery belt motor 88 of the dry machine running until all dispensed microingredients can be cleared from the delivery pipe of the liquid machine or the delivery belt of the dry machine after all metering stops.

When the coil of flush relay K-7 is energized, it closes the K-7 relay contact 8–5 to the flush lamp 182 on the liquid machine or the belt-empty lamp 164 on the dry machine and transmits voltage through its contact 1–4 and lines 226, 226a to the belt motor operating relay K-14 in the dry machine or the delivery pump motor relay K-12 in the liquid machine to keep these motors running.

When the flush or belt-empty relay K-7 times out, its contact 1–4 opens to deenergize the delivery pump relay K-12 or belt motor relay K-14 and shut off the delivery pump motor 72 or in the dry machine belt motor 88. At the same time its contacts 8–5 open to turn off the flush lamp 182, and its contacts 8–6 close transmitting voltage through a line 228 to the coil side of an end-of-cycle relay K-4. Thus energized, relay K-4 applies voltage through its now-closed contact 1–3 and a line 230 to the latch-off coil of latching relay K-1. This coil deenergizes the latch-on coil of the same relay and thus resets the machine for its next complete operating cycle.

The immediately preceding description assumes that no counters have been selected. Now, however, the description will proceed assuming that one or more of the counters on one of the control panels have been selected, turned on, and preset for operation through a predetermined number of counts. With the coil of metering relay K-6 energized as before, voltage is transmitted through the K-6 relay contact 1–3, line 222 and a line 232 to the common poles 8 of all counters 140. At the same time, the metering lamp 180 on the liquid panel or metering lamp 160 on the dry control panel will light. Also at the same time, closed contact 1–3 of relay K-6 supplies voltage through line 222 and 222a to the liquid pump or auger motor relay contact 1. Any of the counters 140 selected supply metering voltage from their common poles 8 to their terminals 9 which in turn feed the voltage through the appropriate count selector switches 142 to the corresponding liquid pump or bin motor relay coil, such as the coil of relay K-8 for liquid pump L-1. Energizing the coil of relay K-8 opens the flush relay contact 1– 4 and closes the relay contact 8–6, thereby supplying voltage to the liquid pump motor L-1 through the A. C. bus 203a and through line 234.

As pump L-1 operates its stroking opens and closes a count switch 236 which may be cam-operated from the pump drive shaft. At the same time, the pulsing of fluid through one of the pressure lines 66 leading from the outlet side of pump L-1 causes an opening and closing of a liquid flow switch 238 connected in series with the pump stroke switch 236. Flow switch 238 is a liquid flow-operated switch of the type shown and described in detail in co-pending U.S. Pat. application Ser. No. 34,335, filed May 4, 1970, and now U.S. Pat. No. 3,670,923. The closing of both pump stroke switch 236 and flow switch 238 is necessary to transmit pulsed voltages through a return line 240 back to the selected count selector switches 142 and counters 140. During this metering period the count coils of the selected counters thus receive these pulsed voltages which step the selected counters one step for each stroke of the liquid pump or each revolution of the dry metering auger.

When the preset number of counts has been received by a selected counter, the counter switch returns to its open position, deenergizing the coil of the selected pump motor relay K-8, and reopening relay contact 8–6 to shut off pump motor L-1.

At the same time, the flush contact 1–4 of relay K-8 is reclosed. If no other metering pumps or augers have been operating during the same period, voltage is supplied through all of the closed flush contacts 1–4 of the various pump motor relays back to the flush relay K-7. However, if other metering pumps have been operating during the same period, the flush cycle will not commence until all counters have counted out and therefore all metering has stopped.

When this occurs, the metering voltage from the K-6 relay fed through lines 222 and 222a is transmitted through all of the closed pump relay flush contacts 1–4 to the flush relay K-7, permitting the flush cycle to commence as previously described. While the K-7 relay is timing, the delivery pump continues to run, flushing all remaining liquid microingredients dispensed through the delivery pipe and into the batch mixer.

When flush relay K-7 times out, the end-of-cycle relay K-4 energizes to activate the latch-off coil of the latching relay K-1, thereby completing the operating cycle of the machine and conditioning it for the next operating cycle.

During the previously described complete cycle of the liquid and dry control systems, the override timers 218 in the liquid and dry control panels are energized by the latch-on side of the K-1 relay. These override timers are set for an operating time longer than the longest overall delivery cycle that will be used, but shorter than the shortest batch-mixing cycle that will be used by the mill. Normally during fault-free operation of the delivery control system, the override timers will therefore never time out to cause an alarm at the control panels.

However, if for some reason the normal delivery cycle is interrupted so that all counts are never completed, and the latch-off side of the relay K-1 is therefore never energized to complete the normal operating cycle, one of the override timers will eventually time out. When this happens, the normally open timer contact 11–13 closes, applying voltage to the coil of a fault relay K-5, to the fault lamp 168 or 190 at the control panel, and to a buzzer 242 also at the control panel. With the coil of fault relay K-5 energized, its relay contact 8–6 also closes to energize the latch-off coil of the latching relay K-1, thereby ending the delivery cycle of the machine and conditioning the machine for the next operating cycle.

A second function of the override timer when it times out is to open its normally closed contact 4–5. Contacts 4 and 5 in both override timers are in series with the ground connection on the feed mill mixer timer. Thus when an alarm condition exists and the override timer times out, override contacts 4–5 open to prevent the mill mixer timer from timing out and thereby preventing the feed in the batch mixer from being released.

The operator can manually selectively override the operation of the override timer in this respect by closing the fault switch 192 on the liquid control panel (fault switch 170 on the dry control panel). The contacts of the fault switch in parallel with the contacts 4–5 of the override timer when closed complete the mixer-timer circuit, permitting the mixer-timer to time out and the batch-mixing cycle to be completed.

In the foregoing description of the operation of the basic control circuit, the operation of only one metering pump was described. However, it will be appreciated that metering pumps L-2, L-3 and L-4 operate in the same manner as described with respect to pump L-1 and can operate simultaneously with pump L-1. The same is true for the metering augers of the dry machine.

Also, in the illustrated liquid delivery system, there is only one liquid pump used to meter each different liquid microingredient. However, optionally two or more liquid pumps can be used for metering any one liquid material. Each such pump may be set to operate at a different speed and the pumps used alternatively depending on whether a high count or a low count is needed. Alternatively, the multiple pumps for each liquid could be connected in the control circuit to operate simultaneously during a delivery cycle when a large quantity of one liquid ingredient is needed. The three-position toggle switch 146 can be used to select whether the pumps will be operated together or singly.

The material-monitoring systems of the liquid and dry machines have already been described in detail. In the liquid machine, material monitoring is performed by the flow control switches 238, there being a separate switch in each of the pump outlet passages. In the dry machine, material monitoring is performed by the microswitches 122 and 126, neither of which can be operated unless there is material within the bins urging the auger tube closure 110 to a slightly open position. From FIGS. 7 and 8 it will be apparent that neither the liquid machine nor the dry machine control system will record a count on the selected counter unless there is actual material flow as a result of operation of the selected metering devices.

In the absence of material flow as a result of metering no count signal returns to the selected counter. If this should occur, the remote control panel will not receive a belt-empty or flush control signal, that is, the control system will never enter its flush phase and at least one of the counters, therefore, will not complete its count. Thus the override timer will eventually time out, causing a fault alarm at the panel. By observing the control panels the operator can quickly determine which dry metering device or liquid metering device is at fault because one of the selected counters will not have completed or possibly even begun its predetermined count. Thus the batch of feed in process will be held until the control operator either corrects the problem or manually bypasses the override timer to complete the batch-mixing cycle.

FIG. 8 discloses the machine side of the dry machine control circuit, which is basically the same circuit as used on the machine side of the liquid control circuit, with obvious differences to accomodate different functions. Although the dry machine might have twenty or more bins, the diagram of FIG. 8 only shows the circuitry for two of the bin or metering auger motors BM1 and BM2 and their associated relays K-15 and K-16 and switches. The operation of the circuit of FIG. 8 will be largely self-explanatory from the previous description of the liquid circuit. In this regard the flush contacts 1–4 of the metering motor relays K-15 and K-16 operate as before to energize the coil of a flush or belt-empty relay K-7 (FIG. 6) when all counters have counted out. These contacts are open when one of the bin motor relay coils is energized from the counters.

Assuming that the coil of bin motor relay K-15 is energized, relay contact 8–6 closes to energize the motor BM 1 (105) for the metering auger of the No. 1 bin. At the same time vibrator motor VM-1 (108) is energized by voltage transmitted across resistor 134 and at least the lowermost, always-closed lead 129 from the resistor to the motor.

Operation of bin motor BM1 opens and closes cam-actuated count switch 128 once during each revolution of the auger drive shaft to transmit pulsed signals through the now-closed solenoid plunger-actuated closure switch 126 back to the corresponding counter to register a count. However, switch 126 will not be closed, as previously noted, unless material is actually being metered from the auger tube. This feature prevents false counts from being registered on the count recorder.

When bin motor BM1 operates, closure solenoid 118 is also energized, provided closure switch 126 first closes under the influence of material flow from the auger tube.

The low-level bin switches 132 of FIG. 4, one for each bin, are shown in FIG. 8. When the level of material in any one bin gets low, its corresponding bin switch 132 closes to energize a bin warning relay (not shown) in the control panel. This relay closes a relay contact to light the bin warning lamp 166 on the dry control panel and at the same time sound a buzzer (not shown) in the panel.

The delivery belt motor relay K-14 of FIG. 8 corresponds to the delivery pump motor relay K-12 of FIG. 7, and the belt motor 88 of FIG. 8 corresponds to the delivery pump motor 72 of FIG. 7. When the K-14 relay coil energizes to close its contact 8–6, a mixer chute flapper solenoid 244 opens the flapper door 96 on the delivery chute 94 leading into the batch mixer, permitting material dropping from delivery belt 58 to enter the batch mixer. At the same time contact 1–3 of relay K-14 closes to drive the belt motor 88 and the motor 246 which operates belt brush 98 at the offbear end of the belt.

When all dry material counters have counted out, all bin motor relays K-15, K-16, etc., deenergize, causing belt-empty relay contacts 1–4 to reclose and voltage to be transmitted to the belt-empty relay K-7 (FIG. 6) which, as previously explained with reference to the liquid machine, keeps belt motor 88 and brush motor 246 running until such relay times out. The mixer chute flapper door solenoid 244 remains energized until the K-7 relay times out. Thus material remaining on the belt after metering stops is conveyed to the batch mixer and dumped, and the belt is cleaned, ready for the next delivery cycle.

FIG. 9 is a diagram of a typical counter circuit and includes a reset coil 250 in a line 251 which is connected with the line 208 leading from contacts 5, 6 and 7 of the reset relay K-2 of FIG. 6. The counter also includes a count coil 252 in a line 253 which connects with terminal 5 of a count selector switch 142. This is the coil that receives pulsed signals from the count switches connected in the metering motor circuits. The counter also includes a bridge counting circuit 255 with leads 256, 257 leading respectively to terminals 4 and 3 of the counter which are connected respectively to a neutral bus and the A. C. bus of the control circuit of FIG. 6. The remainder of the counter circuit, including terminals 7, 8 and 9, is shown in FIG. 6.

The control circuits shown would be modified to accommodate more than one metering pump motor for each liquid ingredient. The same circuits could also be modified to place the metering motor relays on the panel side rather than the machine side of the circuit.

The arrangement and operation of the liquid and dry machines can also be modified to adapt the machines to different mill layouts and modes of operation. The number of bins and pumps used will vary from mill to mill, depending on the size and needs of the mill. Also, some mills may require only a dry machine or only a liquid machine, in which case one can be eliminated without affecting the other.

Having illustrated and described what is presently a preferred embodiment of our invention, it should be apparent that the same permits of modification in arrangement and detail. We claim as our invention all such modifications as come within the true spirit and scope of the following claims.

We claim:

1. The method of forming a mixture of several different flowable materials with the mixture containing predetermined quantities of the several materials comprising:
    metering the several materials separately from separate storage containers for each material using a separate cyclical metering means to dispense each material,
    calibrating the quantity of material dispensed during each metering cycle of the associated metering means,
    counting the number of metering cycles of each metering means during its operation,
    and discontinuing the operation of each metering means independently of the other metering means when the desired number of metering cycles of each metering means have been counted that will dispense the desired quantity of each of the several materials,
    at least some of said metering means beginning their dispensing operations simultaneously but ending their dispensing operations after different time intervals of continuous operation depending on the number of metering cycle counts desired for each of the operating metering means.

2. The method of claim 1 including conveying each of the several materials dispensed directly to a common mixing device for intermixing with the others of said several materials.

3. The method of claim 1 including mixing the several materials together after they are dispensed from their separate storage containers and continuing the mixing of said materials after all of the several metering means have stopped operation following completion of their respective desired number of operating cycles.

4. The method of claim 1 including conveying the several materials dispensed to a mixing device and there mixing the materials together as the several metering means operate, and continuing the conveying and mixing after all metering devices have stopped operation upon completion of their counts and until all materials dispensed have been conveyed to and thoroughly intermixed in the mixing devices.

5. The method of claim 1 including counting only the metering cycles of each metering means that result in material actually being dispensed.

6. The method of adding accurate predetermined amounts of several different microingredients to a finished animal feed mixture of macroingredients during the preparation of the finished feed mixture in a feed mill, comprising the steps:
    storing separately adjacent said mill quantities of said several different microingredients in either readily flowable liquid or dry particle concentrate form,
    during the composition of said mixture of macroingredients in said feed mill, metering the several different microingredients from their separate storage means simultaneously using a separate cyclical metering device for each different microingredient, and conveying the dispensed microingredients into said feed mill for intermixing with each other and with said macroingredients.
    during the metering of said several microingredients, counting the number of metering cycles of each operating metering device,
    and stopping the operation of each metering device independently of the other operating metering devices when each such metering device has completed a predetermined number of operating cycles to dispense a desired amount of a specific microingredient.

7. The method of claim 6 including adding the dispensed microingredients directly to the mixer portion of said feed mill progressively as the mixer operates to mix the macroingredients of the mixture to gradually blend said microingredients into said mixture.

8. The method of claim 6 including conveying dispensed dry microingredients into said feed mill in the undiluted dry particulate concentrated form in which they are metered from their storage containers.

9. The method of claim 6 including metering liquid concentrate microingredients into a liquid carrier and spraying the carrier-borne liquid microingredients directly into the mixer portion of said feed mill in a fine mist after adding the macroingredients to said mixer and during the operation of said mixer.

10. The method of claim 6 including normally continuing the operation of each operating metering device until its predetermined count is completed, but in any event stopping the operation of all metering devices when a predetermined time interval has elapsed, said predetermined time interval being greater than the time interval that would normally be required for all metering devices to complete their predetermined counts.

11. The method of claim 20 wherein the preparation of the finished feed is carried out in a feed mill having a batch-type mixer, said batch-type mixer being operated for a preset mixing time period during each batch mixing cycle, said predetermined time interval determining the maximum operating time for said metering devices being less than said preset mixing time period.

12. The method of claim 6 including providing a separate counter, count selector and count recorder for each separate microingredient to be dispensed, arranging the count selectors in a bank of such selectors on a face of a control panel, indicating the kinds of microingredients required and the quantity of each kind required on a separate formula strip for each different feed formulation produced in said feed mill by expressing the required quantities of microingredients in terms of required metering cycle counts on a strip and indexing the indicated metering cycle counts on each strip with the corresponding count selectors on said panel face, whereby when a given formula strip is removably attached to said panel face alongside the bank of count selectors, the strip will indicate which count selectors should be set and at what count levels for a selected feed formulation.

13. The method of claim 6 including feeding at least one macroingredient of the feed mixture into said feed mill using a cyclical macroingredient metering device, counting the number of metering cycles of said device and stopping the operation of said macroingredient metering device when a predetermined number of counts is completed to dispense a desired quantity of said macroingredient.

14. Apparatus for delivering predetermined accurate small quantities of several different liquid or dry microingredients into a batch-processing mill for processing large quantities of macroingredients into a finished mixture within a batch mixer of said mill, said mill also including mill control means for determining the operating cycle of said batch mixer, said apparatus comprising:
a series of storage containers for storing separately quantities of different microingredients in a flowable, concentrated form,
a separate and independently cyclically operable metering means for metering microingredient material from each said container,
conveyor means for conveying materials dispensed by said metering means into a batch-processing mill,
and control means including counting means for counting each metering cycle of each operating metering means and stopping the operation of each operating metering means independently of the other said metering means upon completion of a predetermined number of operating cycle counts.

15. Apparatus according to claim 14 wherein at least some of said storage containers are adapted for storing flowable dry microingredient materials and corresponding said metering means are operable to meter predeterminable quantities of said dry materials during each metering cycle, said conveyor means comprising a conveyor belt means, said control means including means operable to continue the running of said conveyor belt means for a period of time following completion of the metering cycle counts of all said dry metering means sufficient to empty said belt means of all dispensed materials.

16. Apparatus according to claim 14 wherein said control means includes material flow-indicating means for indicating the actual flow of material under the influence of each said metering means, said counting means and said flow-indicating means for each different ingredient being operably interconnected so that a count can be recorded only when there is actual dispensing of material during the operation of any said metering means.

17. Apparatus according to claim 14 wherein said control means includes means for maintaining said conveyor means in operation for a predetermined time period after the last operating metering means stops upon completion of its count to enable said conveyor means to deliver all dispensed materials to said batch-processing mill.

18. Apparatus according to claim 14 wherein said control means includes a counter-override timing means operable upon timing out to stop the operation of all operating metering means after a predetermined maximum time interval of operation regardless of the stage of completion of the metering cycle counts of said metering means.

19. Apparatus according to claim 18 wherein said count-override timing means includes means operatively connectable to said mill control means to prevent upon the timing out of said timing means the completion of a batch-mixing cycle.

20. Apparatus according to claim 19 wherein said control means includes mill control bypass means operable to override selectively said mill control means and said timing means when timed out to enable completion of a batch-mixing cycle.

21. Apparatus according to claim 14 wherein said control means includes selectively and alternatively operable manual and automatic starting means for commencing simultaneous operation of preselected said metering means, said control means being operable upon selection of said manual start means to operate the selected said metering means and said conveyor means to the completion of an overall operation cycle of said apparatus and to condition said apparatus for the next operating cycle, said control means being operable upon selection of said automatic start means to condition said metering and conveyor means for operation in response to operation of a selected phase of said processing mill.

22. Apparatus according to claim 15 wherein said control means includes remote control means for controlling the delivery and quantity delivered of at least one remote macroingredient to said processing mill during an operating cycle of said mill, said remote control means including a remote counting means for determining the quantity of said macroingredient delivered on a metering-cycle count basis.

23. Apparatus according to claim 14 wherein at least some of said storage containers comprise a bank of dry material storage bins and said cyclical metering means comprises a metering auger extending along the bottom of each bin and into an integral auger tube projecting forwardly from a lower portion of each bin and terminating at a material outlet opening.

24. Apparatus according to claim 23 wherein each said bin includes a normally closed closure member covering said outlet opening of each said auger tube to prevent the accidental spillage of material therefrom, said closure member being movable to an open position permitting material to be metered from said outlet opening upon operation of said auger within said tube.

25. Apparatus according to claim 24 including means operable to open said closure member only in response to a positive pressure of material against said closure member from within said auger tube.

26. Apparatus according to claim 25 wherein said counting means for each metering means is operable to count each revolution of each said metering auger only upon both (1) rotation of said auger and (2) opening of said closure member, whereby a count is recorded only upon a positive flow of material from said outlet opening induced by operation of said auger.

27. Apparatus according to claim 24 wherein each said bin includes vibrator means operable during operation of the associated said auger for inducing the downward flow of material within said bin to said auger.

28. Apparatus according to claim 14 including a vibrator means for each dry material storage container operable during operation of the associated said metering means to induce a flow of material within said container to said metering means, said vibrator means comprising a multiple-frequency vibrator means and material-level sensitive means within said dry storage container operably interconnected in a manner so as to vibrate said container at a high frequency when said dry material is at a high level within said container and at a lower frequency when said material drops to a lower level within said container.

29. Apparatus according to claim 14 wherein said storage containers include liquid microingredient concentrate storage containers, said metering means for each said liquid storage container comprising a positive-displacement pump, said counting means for each said pump including means for counting the strokes of said pump.

30. Apparatus according to claim 29 including flow-sensing means operable to sense a positive liquid flow from the outlet side of said pump, said flow-sensing means being operably interconnected with said counting means so as to record a count only when there is a positive flow of liquid from the outlet side of said pump.

31. Apparatus according to claim 14 wherein said control means includes a control unit housing control elements of said apparatus including a separate counting means for each different said microingredient, each said separate counting means including a manual count selector and a count recorder, said count selectors being arranged in a bank on a control panel face of said unit with each count selector in said bank corresponding to a different said microingredient, a plurality of formula strips selectively attachable to said control panel face in a predetermined position alongside said bank of count selectors, each said formula strip representing a different microingredient combination to be dispensed either by kinds of microingredients or by quantity or both, during a batch-mixing cycle, each said formula strip indicating both the kinds of microingredients to be dispensed and the respective quantites of each kind of expressing the quantity of each kind on said strip in terms of a number of metering cycle counts required to dispense said quantity and by indexing the indicated counts for said different kinds on said strip with the corresponding count selector in said bank of selectors, whereby a formula strip attached in said predetermined position on said panel face indicates both which count selectors to set and what number of counts to select to deliver a predetermined combination of microingredients in predetermined quantities to said processing mill during an operating cycle.

32. In an apparatus for dispensing measured quantities of dry flowable material from a storage container means having metering means for metering said material from a material outlet opening leading from said container means, a flow control means for controlling the quantity of material dispensed from said container means comprising:

a normally closed closure member covering said outlet opening to prevent accidental spillage of material from said container means, closure-operating means for opening and closing said closure member, and means operable in response to a positive material pressure pushing outwardly against said closure member from within said container to activate said closure-operating means to open said closure member, said metering means comprising a cyclical metering device and said control means including counting means for counting each metering cycle of said cyclical metering means and means for stopping the operation of said metering means upon completion of a predetermined number of operating cycle counts, said counting means being operable to count a metering cycle only in response to both (a) operation of said metering means and (b) opening of said closure member, whereby a count is recorded only upon a positive flow of material from said outlet opening induced by operation of said metering means.

* * * * *

UNITED STATES PATENT OFFICE
CERTIFICATE OF CORRECTION

Patent No. 3,822,056　　　　　　　　Dated July 2, 1974

Inventor(s) ROLAND JOSEPH HAWES, JR. et al

It is certified that error appears in the above-identified patent and that said Letters Patent are hereby corrected as shown below:

Assignee: "Howes" should be --Hawes--; Column 2, line 11, "premises" should be --premixes--; column 2, line 39; between "in" and "feed" insert --a--; column 4, line 58, "match" should be --batch--;
column 6, line 31, "3,427,075" should be --3,437,075--; column 6, line 43, "Fig. 1" should be --Fig. 2--; column 10, lines 52-53, "bi-nempty" should be --bin-empty--; column 10, line 65, "threeposition" should be --three-position--; column 11, line 45, "applied" should be --applies--; column 12, line 11, --switch 176-- has been omitted; column 18, line 2, claim 4, "devices" should be --device--; column 18, line 55, claim 11, "20" should be --10--; column 20, line 37, claim 22, "15" should be --14--; column 22, line 5, claim 31, "of", second occurrence should read -- by -- .

Signed and sealed this 22nd day of October 1974.

(SEAL)
Attest:

McCOY M. GIBSON JR.　　　　　　　C. MARSHALL DANN
Attesting Officer　　　　　　　　Commissioner of Patents